(12) United States Patent
Stieler et al.

(10) Patent No.: US 6,487,965 B2
(45) Date of Patent: Dec. 3, 2002

(54) APPARATUS FOR ELIMINATING BACKLASH IN GEAR TRAINS OF PRINTING MACHINES

(75) Inventors: Andreas Stieler, Augsburg (DE); Theo Keilhau, Neusäss (DE)

(73) Assignee: Man Roland Druckmaschinen AG, Offenbach am Main (DE)

(*) Notice: Subject to any disclaimer, the term of this patent is extended or adjusted under 35 U.S.C. 154(b) by 0 days.

(21) Appl. No.: 09/760,860

(22) Filed: Jan. 16, 2001

(65) Prior Publication Data

US 2001/0052301 A1 Dec. 20, 2001

(30) Foreign Application Priority Data

Jan. 15, 2000 (DE) .......................... 100 01 569

(51) Int. Cl.[7] .................................................. B41F 5/00
(52) U.S. Cl. ..................................................... 101/216
(58) Field of Search ........................ 101/216; 74/409, 74/411.5

(56) References Cited

U.S. PATENT DOCUMENTS

| 1,465,584 A | * | 8/1923 | McCullough et al. .......... 310/93 |
| 3,624,438 A | * | 11/1971 | Hoyler ........................ 310/53 |
| 5,813,335 A |   | 9/1998 | Burke et al. |

FOREIGN PATENT DOCUMENTS

| EP | 519909 | * | 2/1995 |
| EP | 849 078 |   | 6/1998 |
| EP | 914 943 |   | 5/1999 |
| JP | 59-123866 | * | 7/1984 |
| JP | 62-55143 | * | 3/1987 |

* cited by examiner

Primary Examiner—Ren Yan
(74) Attorney, Agent, or Firm—Cohen, Pontani, Lieberman & Pavane

(57) ABSTRACT

An apparatus for preventing backlash in a gear train in a printing machine includes a shaft arranged on the printing machine and gearwheels with at least one gearwheel being arranged on the shaft for driving the shaft, and a brake having adjustable braking power, the brake being arranged on the shaft in a direction of drive of the gear train.

6 Claims, 2 Drawing Sheets

APPARATUS FOR ELIMINATING BACKLASH IN GEAR TRAINS OF PRINTING MACHINES

BACKGROUND OF THE INVENTION

1. Field of the Invention

The invention relates to an apparatus for eliminating backlash in gear trains of printing machines.

2. Description of the Related Art

In spur gear trains, the backlash accumulates from gearwheel to gearwheel and this leads to an impermissibly large amount of backlash, especially in the case of long in-series gear trains, thus impairing operation.

European Reference EP 0 849 0478 discloses an apparatus for avoiding backlash between a first and a second gearwheel. For this purpose, an additional auxiliary gearwheel is arranged on the axis of rotation of a first gearwheel, being turned counter to the direction of rotation of the first gearwheel by a resilient force and thereby subjecting the engagement between two teeth of the second gearwheel to stress.

Auxiliary gearwheels that are arranged on the same shaft in a fixed manner but turned counter to the gearwheel are also generally known.

However, these solutions require such an auxiliary gear on every second gearwheel. This represents a large outlay on materials and assembly, especially in the case of longer gear trains. Moreover, there is always a minimum residual backlash, especially with fixed auxiliary gears.

SUMMARY OF THE INVENTION

The object of the present invention is to provide a simple apparatus in which the toothing rests in a defined manner on the load-bearing tooth flanks while minimizing costs related to materials and assembly.

According to the present invention, this object is achieved by providing a brake with an adjustable braking power on at least one shaft having a gear wheel. Due to the simplicity of the construction of the present invention, auxiliary gearwheels are no longer necessary thereby reducing the cost of materials and assembly.

By means of the present invention, an additional artificial adjustable load is introduced into a gear train, thereby creating clearly defined conditions for contact between the tooth flanks of intermeshing gearwheels.

One particular advantage of the present invention is the ability to adjust braking force or load during operation, allowing the apparatus to be adapted in an optimum manner to the requirements of the particular gear train. It is thus possible to drive precisely even assemblies with a low internal friction power, such as drives for transverse perforations. Advantageously, the accuracy of folding is improved due to the prevention of backlash in the gear train.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views, the present invention is shown in schematic form as follows.

DETAILED DESCRIPTION OF THE PRESENTLY PREFERRED EMBODIMENTS

Figure 1:
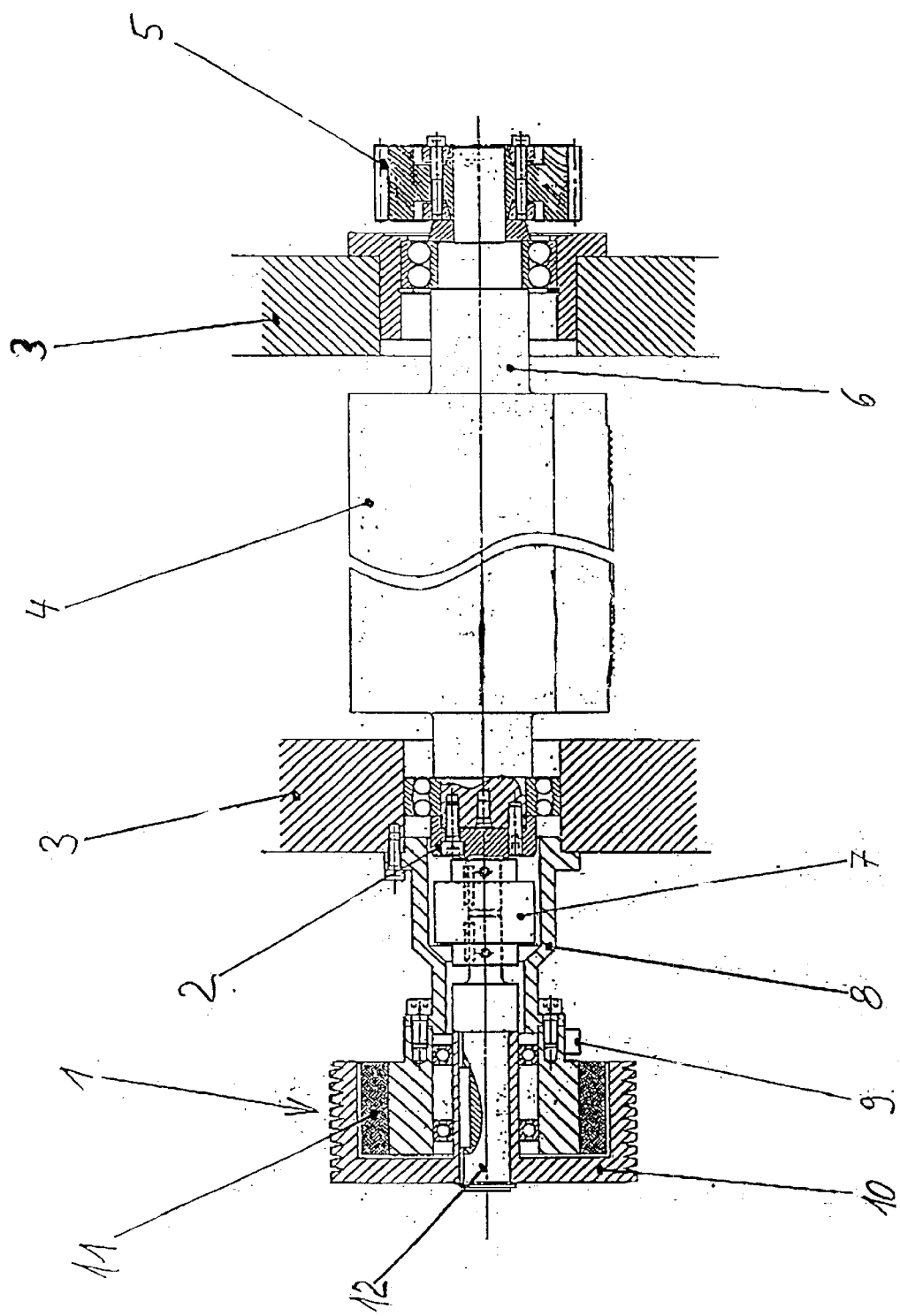
FIG. 1 shows an embodiment of the present invention including a perforating cylinder.

In FIG. 1, a perforating cylinder 4 is shown as an illustrative functional element. This cylinder 4 is shown arranged in the inlet section of a folder of a web-fed rotary press and making a transverse perforation in a web of printing material. The reaction forces of the perforating blade cause alternation in the contact between the flanks of the teeth, which leads to folding tolerances. This alternation in the contact between the flanks of the teeth is prevented by the arrangement according to the invention.

The perforating cylinder 4 is arranged on a first end of a shaft 6, which is mounted in a conventional manner in side walls 3, for example, of a folder. The cylinder 4 is driven by a gearwheel 5, preferably a spur gear.

A coupling 7 is attached to a second or opposite end of the shaft 6 by means of a connector 2 screwed on at the end. This coupling 7 connects the connector 2 to the shaft 12 of an eddy current brake 1 and compensates for angular and/or axial misalignment between the shaft 6 of the perforating cylinder 4 and the shaft 12 of the eddy current brake 1.

The rotor 10 of the eddy current brake 1, which is embodied as an external rotor, is arranged on the shaft 12. The rotor 10 is mounted in the stator 11. The fixed stator 11 is screwed to a flange 8, which is secured to the side wall 3. On the stator 11, there is a control connection 9, via which the connection to a control/regulating unit, a precise braking force or a precisely defined load can be applied at the eddy current brake. The brake 1 can be controlled during operation, allowing the braking force or artificial load to be adapted precisely to the requirements of the particular functional element.

It is also possible to arrange the eddy current brake 1 on the same end of the shaft, next to the gearwheel 5. Other forms of eddy current brake or electric brake are also possible. It is also possible to use brakes with different principles of operation, such as mechanical, e.g., disc or drum brakes, hydraulic or pneumatic brakes.

The apparatus according to the present invention can also be employed with particular advantage on other functional units, such as folding-jaw cylinders or cutting-blade cylinders. A brake according to the invention can be used as a substitute for a number of auxiliary gears on an extremely wide range of driven devices.

Figure 2:
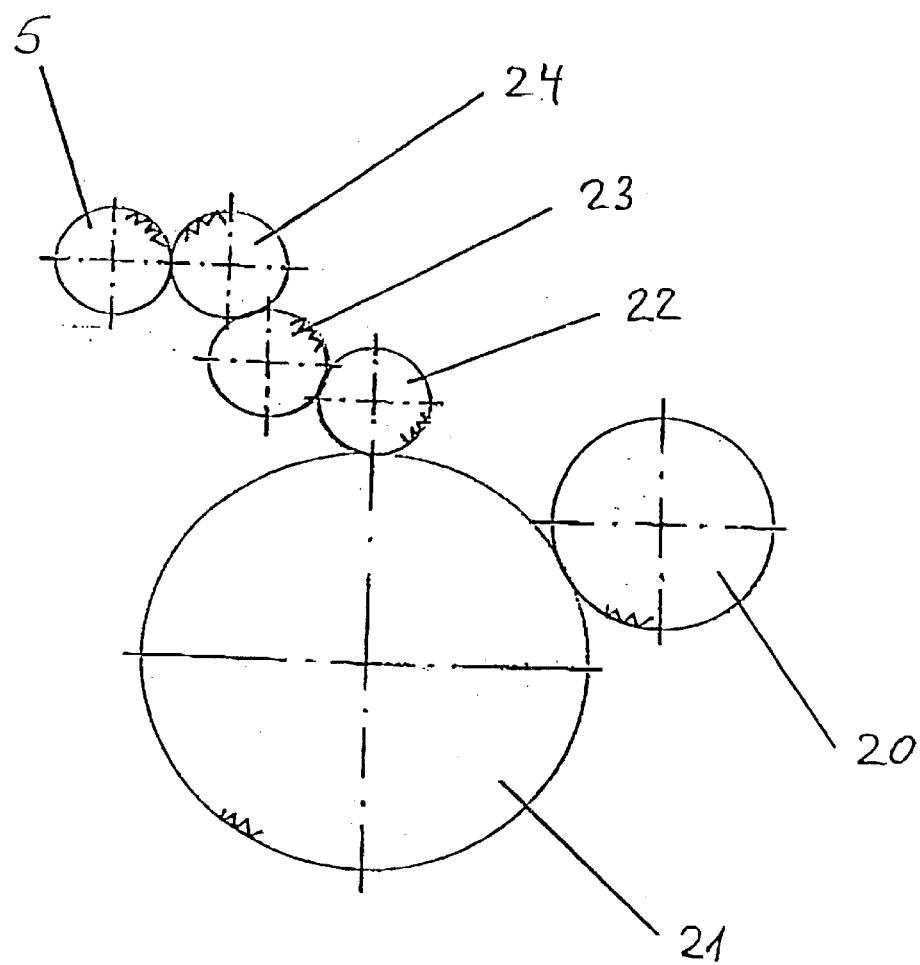
FIG. 2 is a side view of an embodiment of a gear train according to the present invention.

FIG. 2 shows a side view of an embodiment of a gear train according to the present invention. A torque is introduced into the gear train by means of a driving gearwheel 20, which is connected to a motor or, for example, to a synchronizing shaft (not shown). This torque is transmitted to a gearwheel 21, which drives the shaft of a perforating/folding-blade cylinder or the like. From this gearwheel 21, the driving power is transmitted by further gearwheels 22, 23, to the gearwheel 5 of the perforating cylinder 4 shown in FIG. 1.

The direction of drive is thus from the driving gearwheel 20, via the various gearwheels 21, 22, 23, 24, to the end of this illustrative gear train, gearwheel 5, which is braked in a specifically intended manner or subjected to an adjustable load by means of the eddy current brake shown in FIG. 1.

In this example of use, the brake is arranged on the shaft of the last gearwheel 5 in the gear train, which carries a perforating cylinder. However, the brake can also be constructed on shafts of intermediate gears 21, 22, 23, 24, braking preferably being applied to a shaft that drives a functional unit with the greatest effect on the accuracy of work. It is also possible to brake a number of shafts within a gear train.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An assembly for preventing backlash in a gear train in a printing machine, the assembly comprising:
    at least one shaft and gearwheel combination;
    a perforating cylinder mounted on the shaft; and
    a brake configured so as to possess adjustable braking power, the brake being arranged directly on the shaft in a direction of drive of the gear train.

2. The assembly according to claim 1, wherein the brake is arranged on the shaft of a last gearwheel in a direction of drive of the gear train.

3. The assembly according to claim 1, wherein the brake is configured so as to be controllable during operation.

4. The assembly according to claim 1, wherein the brake is selected from the group consisting of a mechanical brake, a hydraulic brake, a pneumatic brake and an electric brake.

5. The assembly according to claim 1, wherein the brake is an eddy current brake.

6. The assembly according to claim 5, wherein the shaft has a first end and a second end and the brake includes a rotor and a stator, the stator being arrangeable on the printing machine, the rotor being mounted in the stator and arranged on the shaft, the assembly further comprising:
    a connector arranged on the second end of the shaft so as to connect the shaft to the rotor; and
    a compensating coupling interposed between the connector and the rotor of the brake.

* * * * *